March 15, 1932.          C. J. TOWNSEND          1,850,039

FISHHOOK HOLDER

Filed Aug. 20, 1930

Inventor

C. J. Townsend
By Miller & Miller
Attorneys

Patented Mar. 15, 1932

1,850,039

UNITED STATES PATENT OFFICE

CHARLIE J. TOWNSEND, OF POCATELLO, IDAHO

FISHHOOK HOLDER

Application filed August 20, 1930. Serial No. 476,678.

This invention relates to a fish hook holder and more particularly to a holder made of a solid block of cork or other suitable penetrable material, having a plurality of channels adapted to receive a plurality of fish hook holders of varying sizes, whereby the shanks of the fish hooks are placed in the channels while the points are embedded in the block.

A further object of this invention is to provide a fish hook holder which is an improvement over that shown in Patent No. 1,755,903, granted April 22nd, 1930, whereby a neater and more attractive holder is provided, which will hold a greater number of fish hooks for the same size of block. With the above and other objects in view, as will hereafter become apparent, this invention comprises the following constructions, combinations and arrangements of parts, set forth in the following specification and accompanying drawings and falling within the scope of what is claimed. In the drawings, Figure 1 is a top plan view of this improved fish hook holder.

Figure 1:
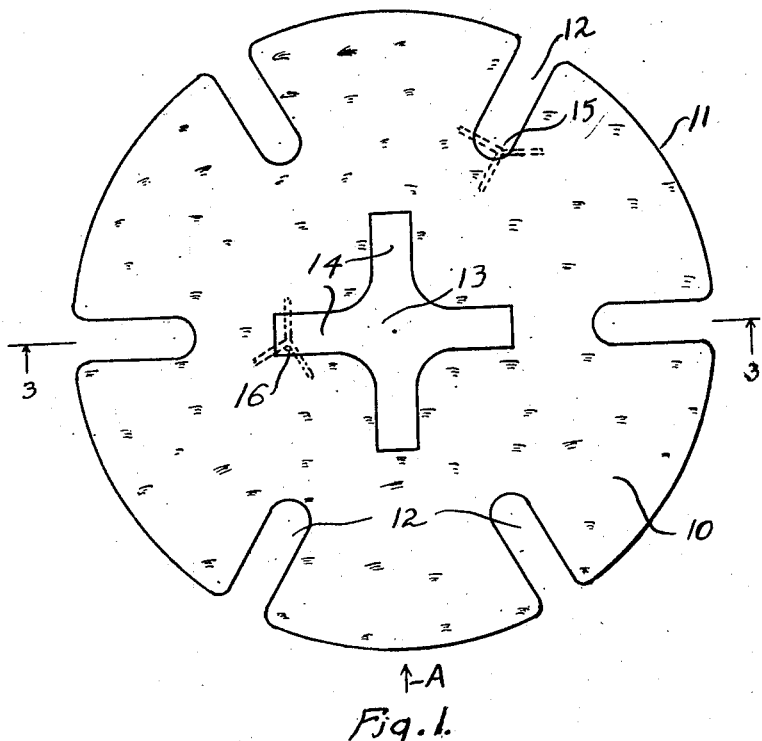
Figure 2:
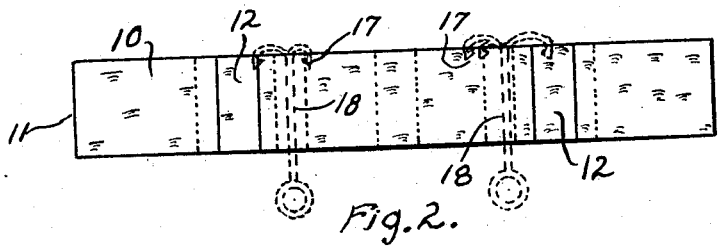
Figure 2 is an edge view of this fish hook holder looking in the direction of arrow A of Figure 1.
Figure 3:
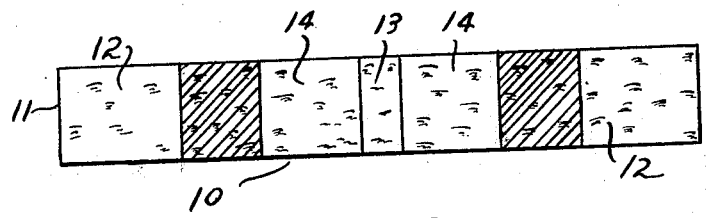
Figure 3 is a section of this fish hook holder on lines 3—3 of Figure 1.

This improved fish hook holder comprises a rigid block of relatively soft penetrable material, preferably of cork, as shown, although other suitable material may be substituted, such as balsa wood or any other suitable natural or artificially prepared material. As shown, the block 10 may be preferably, although not necessarily, substantially circular in outline and will be of suitable thickness in proportion to its diameter. Projecting inwardly from the edge 11 of the block 10 are a number of channels 12, suitably spaced from each other about the edge. These channels, if necessary, may be of different widths to accommodate different size fish hooks, although, as will be apparent, a great variety of sizes of fish hooks may be accommodated in the channels shown. Internally of the body 10 is an opening 13. This opening 13 has been shown as being centrally located of the circular block, but as is quite obvious, this opening 13 may be located other than centrally of the block and, likewise, there may be more than one such opening 13, especially if the block be other than circular or be of larger size than shown. A plurality of channels 14 are cut into the block leading from the opening 13, toward the edge 11.

The channels 12 and 14 are adapted to receive therein fish hooks 15 and 16, the barbed portions 17 of the hooks being embedded in the block while the shanks 18 project through the channels. As thus shown, a comparatively small block or holder 10 will hold a great number of fish hooks therein holding some of the hooks internally of the block in the internal channels 14, thus occupying space that would otherwise be wasted.

Having thus set forth and described the nature of this invention, what is claimed is:

A fish hook holder comprising a circular rigid block of a relatively soft material, said block having a plurality of narrow channels all projecting inwardly toward the center from the edge thereof, said block also having a central opening therethrough, and a plurality of narrow channels projecting radially from said central opening toward the circumference of said block, whereby said block may have secured therein a plurality of fish hooks with the points embedded in said block and the shanks placed in said internal and external channels.

In testimony whereof I affix my signature.

CHARLIE J. TOWNSEND.